United States Patent [19]

Seiter et al.

[11] 3,746,877

[45] July 17, 1973

[54] EMERGENCY LIGHT UNIT

[76] Inventors: William A. Seiter, 80 Smoke Tree Ln.; Calvin J. Christensen, 6 Stone Cliff Ct., both of Fenton, Mo. 63026

[22] Filed: Mar. 8, 1971

[21] Appl. No.: 121,990

[52] U.S. Cl............... 307/66, 174/55, 315/97, 340/333
[51] Int. Cl. ............................................. H02j 7/00
[58] Field of Search................. 315/97; 340/333; 307/64, 66; 174/53, 54, 55; 200/167 A; 240/10.63, 10.64, 52.1 R

[56] References Cited
UNITED STATES PATENTS

| | | | |
|---|---|---|---|
| 3,324,304 | 6/1967 | Duncan.............................. | 307/66 |
| 2,909,587 | 10/1959 | Smedley............................ | 307/66 X |

*Primary Examiner*—Herman J. Hohauser
*Attorney*—Rogers, Ezell, Eilers & Robbins

[57] ABSTRACT

An emergency light unit of a size for mounting in a standard electrical wall box. The unit is preferably self contained and includes means for energizing the light when the main electrical power fails and the ambient light in the area in which it is mounted is below a prescribed level. The light is powered during emergency conditions from rechargeable batteries which are continuously and automatically charged when the main power is operational. All of the components of the unit, including the batteries, are mounted in a casing of preferably unitary construction at the front of which is exposed a light bulb for supplying the emergency light, the light-sensitive surface of a photocell for sensing the ambient light level in the area, and an electrical utility outlet. Means accessible from the front of the unit are also provided for testing its operability.

18 Claims, 12 Drawing Figures

Patented July 17, 1973
3,746,877
2 Sheets-Sheet 1
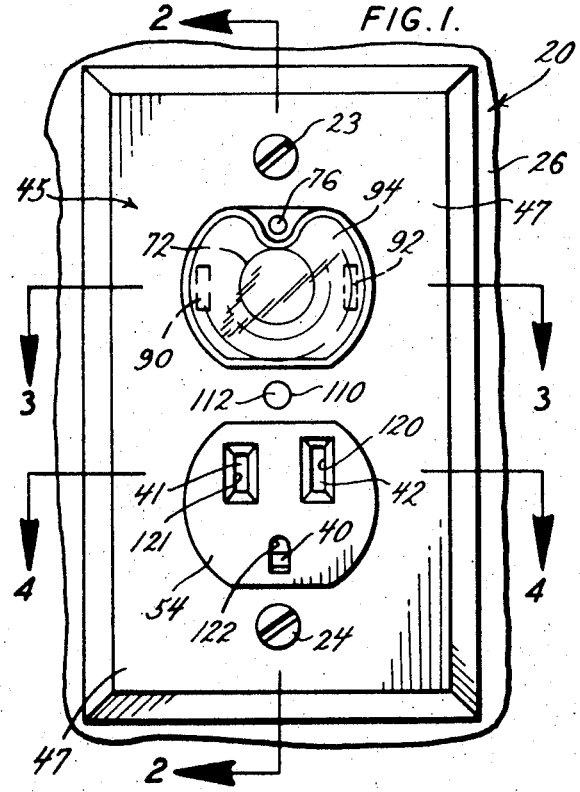
FIG. 1.
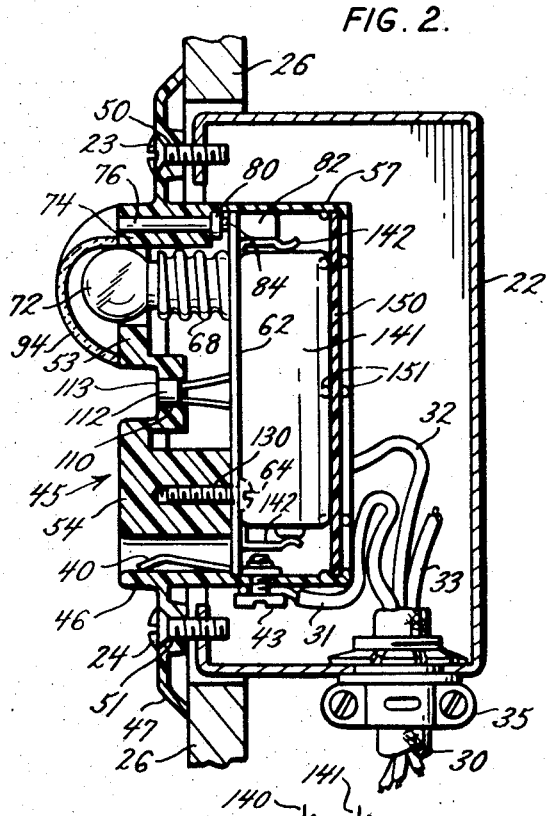
FIG. 2.
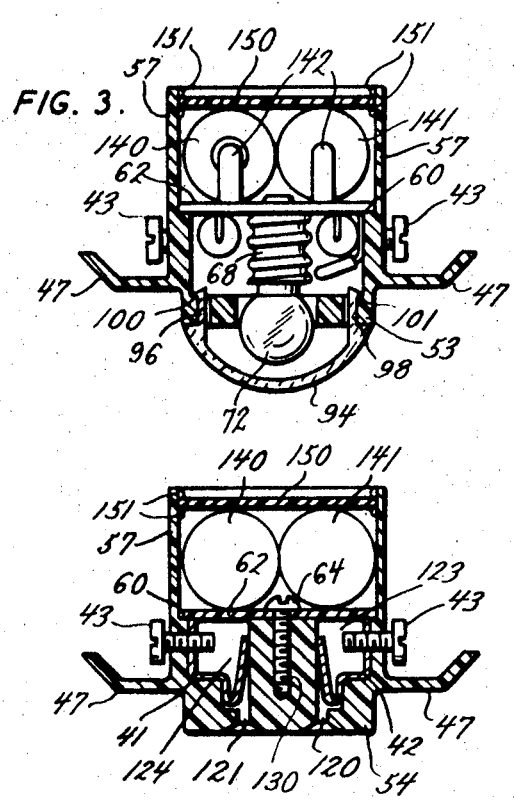
FIG. 3.
FIG. 4.
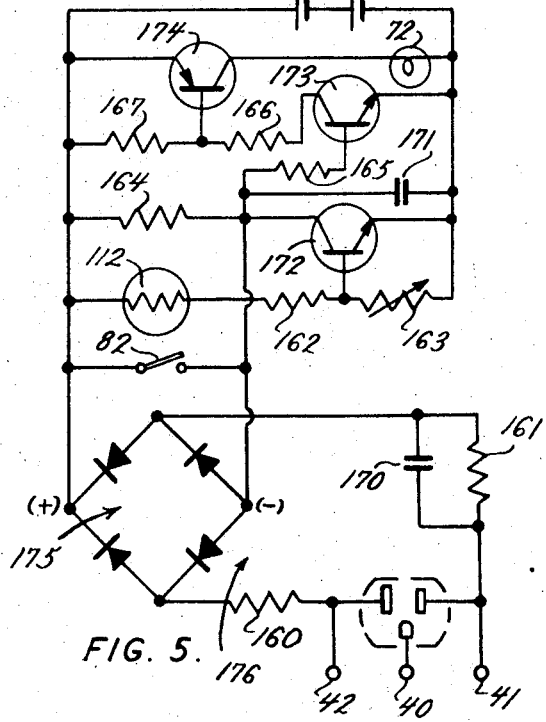
FIG. 5.
INVENTORS
WILLIAM A. SEITER
CALVIN J. CHRISTENSEN
BY Rogers, Ezell, Eilers & Robbins
THEIR ATTORNEYS

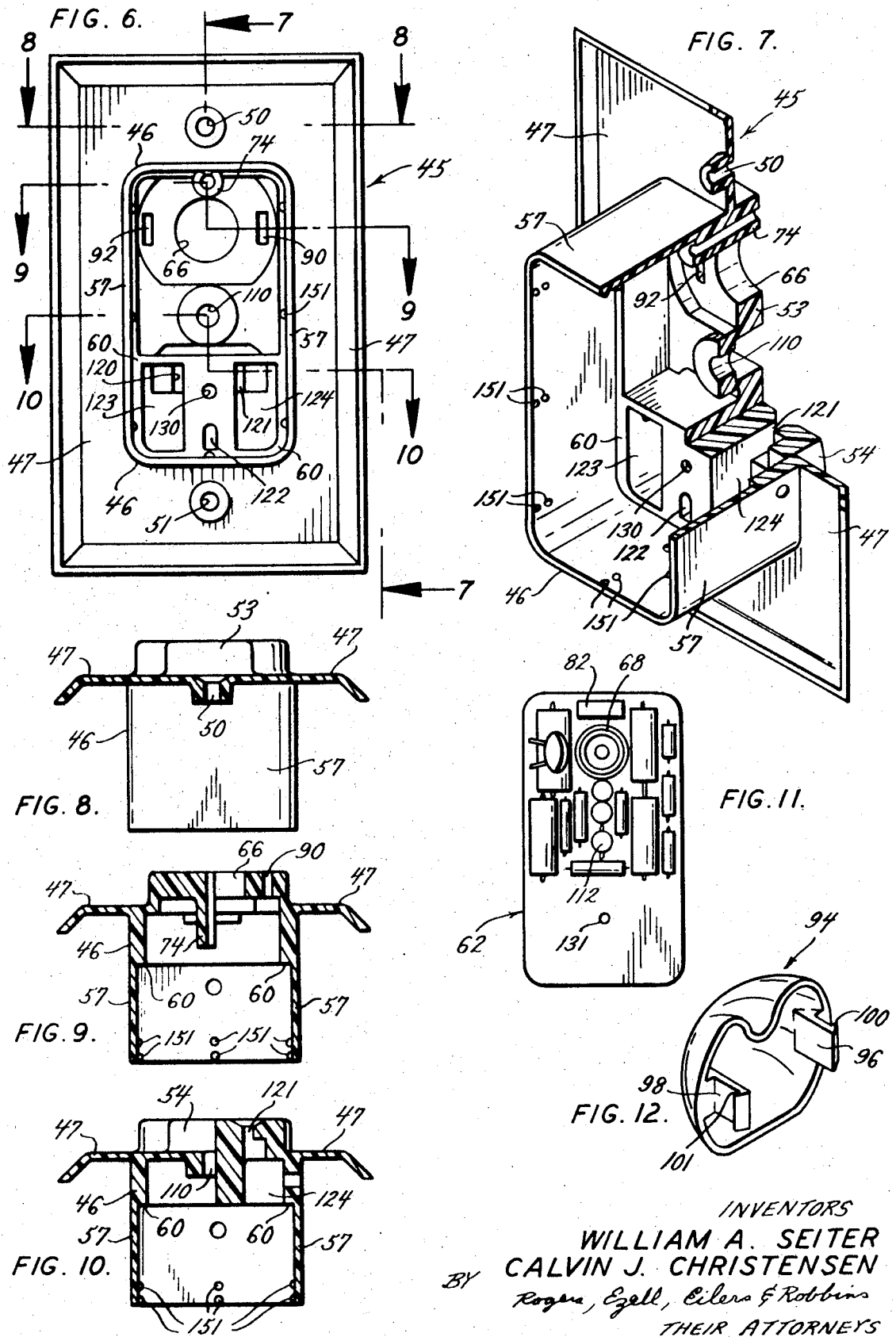

EMERGENCY LIGHT UNIT

BACKGROUND OF THE INVENTION

Various types of emergency light devices have been developed for supplying light to an area, such as the room of a building, when the building's main power fails. Such devices may also include means for energizing the light only when the light in the room is below a prescribed level, and for automatically recharging emergency power batteries when the main power is on. Examples of these are found in U. S. Pat. Nos. 3,159,755; 3,294,977; and 3,486,068. Such devices, however, are relatively large, requiring sophisticated installation for mounting in the wall or ceiling of a room, and even where mounted externally on the wall or ceiling, requiring special wiring. Hence, the prior art devices are not readily adaptable for installation in buildings initially unequipped for their use.

It is therefore desirable to provide an automatic device for supplying emergency light to the room in which it is installed during a main power failure, and which is relatively low in cost, attractive, and easy to install even in buildings initially unequipped for its use. This invention is such a device.

SUMMARY OF THE INVENTION

The emergency light unit of this invention is a completely self-contained unit which is made to mount in a standard electrical wall box such as that used for mounting an ordinary light switch or electrical outlet. The front of the unit is a combination face plate and casing for holding a lamp which provides the emergency light, an electrical receptacle of standard form for use as a spare electrical outlet, the light-sensitive end of a photocell for sensing the ambient light level in the room, and a test switch actuating rod used for testing the operability of the unit. The front dimensions of the unit are approximately those of a standard wall switch or wall receptacle cover plate. The remainder of the casing extends rearwardly of the cover plate and is preferably integral therewith for housing emergency power batteries and other electrical and mechanical components of the unit. This rearwardly extending portion is substantially smaller than a standard electrical box to allow room for the power cables from the main power supply which are connected to the unit casing by means of external electrical terminal screws mounted thereon. Therefore, even in buildings not designed for emergency light units, the unit of this invention is easily installed in the same electrical wall box used for mounting a standard wall receptacle, and without loss of the receptacle as one is included in the unit.

Electrical circuit means are contained in the casing for automatically sensing a main power failure and the ambient light in the room, and for energizing the emergency light when the main power fails and the ambient light is below a prescribed level. Means are also provided for testing the units operability, and, except during periods of power failure, automatically recharging its emergency power batteries from the main electrical power. The unit includes novel structural and circuit design features which provide exceptional long, trouble free, reliable operation.

DESCRIPTION OF THE DRAWINGS

FIG. 1 is a front elevational view at approximately full scale of the emergency light unit of this invention;

FIG. 2 is a view in section taken along the line 2—2 of FIG. 1 including the major internal components of the unit;

FIG. 3 is a view in section taken along the line 3—3 of FIG. 1 including the major internal components of the unit;

FIG. 4 is a view in section taken along the line 4—4 of FIG. 1 including the major internal components of the unit;

FIG. 5 is a schematic drawing of the circuit of this invention;

FIG. 6 is a rear elevational view of the unit casing with the back cover plate removed;

FIG. 7 is an isometric view of the casing of FIG. 6;

FIG. 8 is a view in section taken along the line 8—8 of FIG. 6;

FIG. 9 is a view in section taken along the line 9—9 of FIG. 6;

FIG. 10 is a view in section taken along the line 10—10 of FIG. 6;

FIG. 11 is a front elevational view of the circuit board used in the unit of this invention; and FIG. 12 is an isometric view of the lamp dome of this invention.

DETAILED DESCRIPTION OF THE PREFERRED EMBODIMENT

There is shown the emergency light unit 20 of this invention mounted in a standard electrical wall box 22 by means of mounting screws 23 and 24. The electrical box 22 in turn is shown mounted in a wall 26 which could be a wall in any room in which the unit 20 is to be mounted. The electrical box 22 is of a type commonly known in the art for mounting electrical wall switches and receptacles and is of a size very nearly to that shown in the drawings. In fact, with the exception of FIG. 5, each of the figures is drawn to approximately full scale to better illustrate the actual sizes of the components involved. It is one of the primary novel features of this invention that the emergency light unit 20 is of a size small enough to be mounted in a standard electrical wall box, greatly facilitating installation of the unit.

A suitable power cable 30, including a ground lead 31 and conductors 32 and 33, extends through an appropriate electrical cable connector 35 mounted in an aperture in the box 22 with the electrical leads 31, 32 and 33 connected to terminals 40, 41 and 42, respectively, of the unit by means of terminal screws 43. The power transmitted by the cable 30 is 110 volt AC, 60-cycle, with a safety ground connection.

The emergency light unit 20 of this invention generally includes a unitary casing and cover plate combination 45, having a central casing portion 46, and flange portions 47 continuous with and extending outwardly from the central portion 46 to contact the front surface of the wall 26. The flanges 47 include apertures 50 and 51 which receive the mounting screws 23 and 24, respectively. The central portion 46 of the casing 45 includes an upper forward protruding portion 53 in which a light bulb is mounted as will be described, a lower forward protruding portion 54 which forms an electrical utility outlet to be described, and a rearwardly protruding portion 57 which extends into the electrical box 22 and which houses most of the electrical componentry of this invention. In this described embodiment, the entire casing and cover plate combination 45, including the protruding portions 53, 54 and 57 is of a unitary construction formed of injected molded plastic of a suitable type approved for use in housing electrical components.

The casing portion 57 includes an inwardly-extending ledge 60 on which is mounted a circuit board 62 by means of a mounting screw 64. The circuit board 62, as shown in FIG. 11, has mounted thereon the electrical circuit components of this invention. The upper forwardly-protruding portion 53 has a relatively large, centrally located, aperture 66 into which one end of a bulb socket 68 extends, the other end of the bulb socket 68 being mounted both physically and electrically to the circuit board 62, in accordance with the electrical circuit to be described. A light bulb 72 of the approximate size shown in FIG. 2 and having a voltage rating of approximately 2.5 volts is mounted in the socket 68.

As best shown in FIGS. 2, 7 and 9, the casing directly above the aperture 66 is formed to define a cylindrical housing 74 which extends rearwardly of the aperture 66 toward the circuit board 62 and in which a rod 76 is mounted, the rod having a head portion 80 which acts to limit the forward movement of the rod. A test switch 82, for testing the operability of the emergency unit, is mounted at the top of the circuit board 62, as best shown in FIG. 2, with its spring-biased push-type actuating arm 84 extending forward of the circuit board 62 and in contact with the head portion 80 of the rod 76. The switch 82 is of a type that, when the rod 76 is pushed rearwardly with an appropriate instrument, the button actuator 84 is pushed against its spring bias to close the switch. Preferably, the switch contacts are gold-plated for long wear.

Symmetrically on either side of the aperture 66 in which the bulb socket 68 is mounted are parallel elongated vertical slots 90 and 92. A dome cover 94, shaped as shown in FIG. 12, has rearwardly extending snap arms 96 and 98 which fit into the slots 90 and 92, respectively, for mounting the dome over the bulb 72. The snap arms 96 and 98 have shoulders 100 and 101 which engage the inside surface of the casing, as best shown in FIG. 3 to hold the dome in position. The dome may be either clear or translucent to diffuse the light from the bulb 72.

Centrally located in the front of the casing 45, between the upper and lower protuding portions 53 and 54, is an aperture 110. A photocell 112 is mounted with one end extending into the aperture 110 with its light-sensitive surface 113 exposed to the ambient light at the front of the unit. The back end of the photocell 112 is electrically and mechanically connected to the circuit board 62. Its purpose is to measure the ambient light in the room in which the emergency light unit is mounted to insure that the bulb 72 lights only when the ambient light level is below a prescribed value, as will be described in more detail in connection with the circuit of FIG. 5.

The lower protruding portion 54, although molded in one piece with the rest of the casing 45, is generally the shape of a standard polarized 110-volt, AC, electrical outlet with a ground terminal, the portion 54 having a pair of parallel elongated slots 120 and 121 and a smaller rounded slot 122 below the slots 120 and 121 through its wall identical to those of a standard 110 V, AC, grounded electrical wall outlet (the slot 120 being slightly longer than the slot 121 as is common with polarized receptacles). The slots 120 and 121 communicate with the cavities 123 and 124 which house the electrical terminals 42 and 41, to which as heretofore described, are connected the conductors 33 and 32 by means of the terminal screws 43. In like manner, the ground terminal 40 is mounted within the slot 122 to which, as heretofore described, is connected the conductor 31 by means of the connecting screw 43. Between the cavities 123 and 124 and above the slot 122 is a threaded bore 130 extending forwardly only partially through the front wall of the lower protruding portion 54. A hole 131 in the circuit board 62 is axially aligned with the bore 130. The screw 64 extends through the hole 131 into the bore 130 for mounting the circuit board in the casing 45. The lower protruding portion 54 represents an important novel feature of this invention in providing a spare electrical outlet for use as desired. This feature is particularly important where the unit is mounted in place of an electrical receptacle.

A pair of rechargeable nickle-cadmium batteries 140 and 141 are mounted between appropriate battery terminals 142 which terminals are electrically and mechanically connected to the circuit board 62. As will be explained in describing the circuit of FIG. 5, the batteries power the light 72 when there is a main power failure and the ambient room light is below a prescribed level as sensed by the photocell 112 and are charging whenever the main power is on.

A plate 150 encloses the back of the casing 45 and is attached by any suitable means such as bead pairs 151 between which the plate 150 is snapped in place.

It can be seen that the compartment behind the circuit board 62 is almost completely occupied by the batteries 140 and 141, as is the lower portion in front of the circuit board 62 by the electrical utility receptacle. Therefore, the remaining electrical components as represented on the circuit board 62 of FIG. 11 and shown schematically in FIG. 5, are mounted in front of the circuit board 62 in the areas around the bulb socket 68 and the photocell 112.

While it is within the scope of this invention to use the standard wall box or facsimile thereof as the unit casing, or to provide a fragmented casing, such as by making the cover plate portion 47, receptacle portion 54, and casing portion 57 separate pieces, this described self-contained, unitary construction greatly facilitates manufacture and installation. Furthermore, such a unit is easily adaptable to providing a hermetically sealed unit for use in volitile ambient environments, there being few interface surfaces between components that require sealing.

ELECTRICAL OPERATION OF THE EMERGENCY UNIT

Referring to the schematic of FIG. 5, the electrical operation of the emergency unit of this invention will be explained. There is shown schematically the terminals 40, 41, and 42 to which the conductors 31, 32 and 33 of the power cable 30 are connected. Power is supplied to the unit through the cable 30 from the main power of the building. Hence, whenever power is delivered through the cable 30, the receptacle is operational for use in supplying electrical power as an ordinary wall outlet. The other electrical components of the unit are connected as shown schematically in FIG. 5, and consist of resistors 160, 161, 162, variable resistor 163, and resistors 164, 165, 166 and 167, capacitors 170, 171, transistors 172, 173 and 174, the switch 82, the photocell 112, the lamp 72, the batteries 140 and 141, and a diode bridge 175.

The resistors 160 and 161, capacitor 170, and diode bridge 175 are connected as shown to form a fullwave rectifier circuit 176 for converting the main AC power to charging power for the batteries 140 and 141. Basically, the unit of this invention is designed to provide emergency light for the room in which it is mounted only when the main power to the room fails and the ambient light in the room is below a prescribed level, and to charge the batteries 140 and 141, which supply emergency power for the light, whenever the main power is on. Furthermore, the unit includes means for testing its operability. Therefore, the device actually has five modes of operation as follows:

Mode 1 - Ambient light above the prescribed level, power on, light off;

Mode 2 - Ambient light above the prescribed level, power off, light off;

Mode 3 - Ambient light below the prescribed level, power on, light off;

Mode 4 - Ambient light below the prescribed level, power off, light on; and

Mode 5 - Test mode.

MODE 1 - Ambient light above the prescribed level, power on, light off

With the AC power on, the recitified voltage from the full wave rectifier 176 appears across the resistor 164 which is of a relatively high value for purposes which will be explained, the switch 82 being open except in the test mode. With the ambient light in the room above the prescribed level, which in this described embodiment is set to approximately 1 foot candle by appropriate setting of the variable resistor 163, the photocell 112 has a relatively low resistance which applies enough of the voltage from the batteries 140 and 141 across the resistor 163 to bias the transistor 172 to the "on" condition.

With the transistor 172 "on," the resistor 164 drives the collector of the transistor 172 to a very low voltage, this voltage being insufficient to turn on the transistor 173. With the transistor 173 "off," there is no bias current for the transistor 174 so that the transistor 174 remains off, keeping the light 72 from turning on. While the batteries 140 and 141 are supplying only a very little current (probably in the microamp range) through the resistors 162 and 163 to bias the transistor 172 to the "on" condition, the batteries 140 and 141 are being charged by the rectified power from the diode bridge 175 with the positive side of the rectified power applied directly to the positive side of the batteries, and the negative side of the rectified power supplied through the collector and emitter of the transistor 172 to the negative side of the batteries. The resistor 164 is relatively large so that most of the rectified power goes to charge the batteries with very little loss through the transistor 172.

MODE 2 - Ambient light above the prescribed level, power off, light off

With the AC power off, the only power to the circuit is from the batteries 140 and 141 which, of course, is of a relatively low voltage (approximately 2.4 volts) compared to the rectified voltage from the rectifier network 176. With the ambient light in the room above the prescribed level, the resistance of the photocell 112 is relatively low so that most of the voltage of the batteries 140 and 141 appears across the resistor 163 to turn on the transistor 172. With the transistor 172 "on," the transistors 173 and 174 and the lamp 72 are "off" as heretofore described in connection with Mode 1 operation. Of course, since the power is "off," there is no rectified power to charge the batteries 140 and 141. However, the battery energy is being used very sparingly as the lamp 72 is off, and as previously described only a few microamps are used from the batteries to turn on the transistor 172. Also, as previously described, the resistor 164 is relatively large to offer a high impedance path through the transistor 172 across the batteries, keeping the current drain very low. Under this condition, the batteries will last for many hours and still have plenty of power to operate the lamp 72, should the ambient light become lower than the prescribed level.

MODE 3 - Ambient light below the prescribed level, power on, light off

Just as with the operation in Mode 1, the rectified power from the diode network 175 appears across the resistor 164. However, because the ambient light in the room is below the prescribed level as set by the variable resistor 163, the resistance of the photocell 112 is extremely high so that the biasing voltage across the resistor 163 is insufficient to turn on the transistor 172. If the AC power were not on, the batteries 140 and 141 would supply enough voltage across the resistor 165 to turn on the transistors 173 and 174 and the lamp 72. However, with the AC power "on," the power supply network 176 of the circuit is trying to deliver as much charging current as required up to a maximum of 60 milliamps, the maximum current capacity of 60 milliamps being determined by the values of the resistors 160 and 161 and the capacitor 170. With the power supply of the circuit trying to deliver the required charging current, the potential at the juction between the resistors 164 and 165 becomes negative with respect to the emitter potential of the transistor 173, the emitter of the transistor 173 being at the same potential as the negative side of the batteries 140 and 141. When the potential across the base-emitter junction of the transistor 173 drops to approximately −8 volts, the transistor 173 goes into a reverse bias Zener mode, causing current to flow from emitter to base in the transistor 173, thus providing a complete path for supplying the rectified charging power from the network 176 to the batteries 140 and 141. With the base-emitter junction of the transistor 173 reverse biased and operating in a reverse Zener mode, the transistor 173 is "off" so that the transistor 174 and lamp 172 are also "off."

MODE 4 - Ambient light below the prescribed level, power off, light on

With the ambient light in the room below the prescribed level, the transistor 172 is off as heretofore described in connection with Mode 3 operation. With the transistor 172 off and with the power supply network 176 of the circuit supplying no rectified power to create a reverse Zener condition in the transistor 173, current supplied by the batteries 140 and 141 is fed through the resistors 164 and 165 to bias the transistor 173 to an "on" condition. With the transistor 173 "on," the transistor 174 is biased to an "on" condition, and with the transistor 174 on, sufficient current (approximately 350 milliamps) is supplied from the batteries 140 and 141 through the emitter-collector junction of the transistor 174 to light the lamp 72.

MODE 5 —

Test mode.

To operate in the test mode, the operator simply simulates the conditions of Mode 4 by covering the light-sensitive surface 113 of the photocell 112 to simulate a darkened condition in the room, while simultaneously depressing the rod 76 to close the switch 82, which in effect shorts out the rectified power supply. This causes the lamp 72 to light as described in regard to the operation of the circuit in Mode 4.

By the way of example, the following chart gives values for the circuit components of FIG. 5 for one embodiment of the invention:

| Component | Value |
| --- | --- |
| 160 | 1 ohm, ½ W |
| 161 | 20 K, 1 W |
| 162 | 18K, ½ W |
| 163 | 500 K, Pot. |
| 164 | 5.6K, 1 W |
| 165 | 470 ohm, 2 W |
| 166 | 150 ohm, 1 W |
| 167 | 18K, ½ W |
| 170 | 1.5 microfarad, 200 V, mylar |
| 171 | .68 microfarad, 50V, ceramic |
| 172 | 2N 3704 NPN, general purpose |
| 173 | 2N 4921 NPN, medium power |
| 174 | 2N 3055 PNP, medium power |
| 140 141 | each 1.24V., 600 mah, nickel cadmium |
| 112 | 5K at 2 Ft. candles |
| 72 | Pilot lamp No. 263, gold plated contacts |

The circuit of this invention has several unique features. As the current in the collector of the transistor 174 decreases due to a decrease of power from the batteries 140 and 141, the resistance in the emitter-collector junction of the transistor 174 decreases producing more voltage across the lamp 72 thus acting as a compensating device to maintain the light output of the lamp 72 constant with slight variations in battery power. Actually the nickle-cadmium batteries used in this described embodiment of the invention sustain their power very well over the 2 hours of operation. Not until the last 5 or 10 minutes of operation does their power diminish rapidly.

Another interesting feature is the use of NPN and PNP type transistors for the transistors 173 and 174. With these transistors connected as shown, the only time there is a heavy drain on the batteries 140 and 141 (350 milliamps) is when the lamp 72 is on. In all other modes the battery drain is perhaps 1 milliamp. The batteries themselves are rechargeable hundreds of times and will power the lamp 72 continuously for about 2 hours.

Another unique feature is that nearly all of the charging current from the power supply is supplied across the batteries. Because the batteries require a maximum charging current of approximately 60 milliamps, the current capacity of the power supply need be only approximately 60 milliamps, which allows the capacitor 170 to be a non-polarized, non-electrolytic type for much longer life. If the circuit were designed, as many of the prior art devices, with considerable current loss, the power supply current capacity would have to be much higher to provide sufficient charge for the batteries. This in turn would require the capacitor 170 to be much larger so that a non-electrolytic type capacitor could not be used.

Along these same lines, the purpose of the capacitor 171 is to filter out ripple at the base of the transistor 173 that might otherwise cause the light to come on inadvertently, such as in Mode 1 or Mode 3 operation. Because the current at base of the transistor 173 is in the microamp range, the capacitor 171 can be much smaller than if the current were 50 milliamps as in some prior art devices, again allowing for the use of a non-polarized, non-electrolytic capacitor. Hence, the circuit design allowing the capacitors 170 and 171 to be small and therefore non-electrolytic is considered very important in providing a reliable, long life, emergency light unit. In fact, it is contemplated that the design of this described embodiment could be guaranteed to operate trouble-free for a period of 10 years.

Thus, there has been described a self-contained emergency light unit of a size that can be easily mounted in a standard electrical wall box in a matter of minutes to provide emergency light when there is a power failure and when the ambient light in the room is below a prescribed level.

Various changes and modifications may be made within this invention as will be readily apparent to those skilled in the art. Such changes and modifications are within the scope and teaching of this invention as defined by the claims appended hereto.

What is claimed is:

1. An emergency light unit for mounting in a standard electrical wall box of a building, the unit comprising a frontal mounting plate, a lamp for supplying the emergency light, means for mechanically mounting the lamp so that its light emanates from the front of the frontal mounting plate, means for mounting the frontal mounting plate to the wall box, electrical circuit means housed within the wall box, means for connecting the electrical circuit means to the main power supply of the building in which the unit is installed, emergency power supply means mounted in the wall box, means associated with the electrical circuit means for sensing a power failure in the main power supply of the building, and for supplying electrical power from the emergency power supply means to the lamp, thereby energizing the lamp, when a power failure is sensed, switch means mounted within the wall box and actuatable from the front of the unit, the switch means being actuated by axial movement of a spring biased rod, the rod being reciprocally mounted in the frontal plate with one end exposed at the front of the unit and the other end contacting the switch means for actuation thereof as the rod is moved rearwardly, means associated with the electrical circuit means and responsive to actuation of the switch means for testing the operability of the unit, and means for mounting the electrical wall box in the wall of the room.

2. The emergency light unit of claim 1 including photosensitive means mounted in the frontal mounting plate for detecting the ambient light level in the immediate area in front of the unit, and means associated with the electrical circuit means and responsive to the photosensitive means for supplying power from the emergency power supply means to the lamp only when the light in the room is below a prescribed level.

3. The emergency light of claim 1 wherein the emergency power supply means includes rechargeable batteries, and including means associated with the electrical circuit means for charging the batteries whenever the main power is on.

4. The emergency light of claim 1 including an electrical receptacle accessible from the front of the frontal plate, and means connecting the electrical receptacle to the main power supply for use of the receptacle when the main power is on.

5. The emergency light of claim 1 wherein the actuation of the switch means simulates a power failure, thereby causing the lamp to light if the unit is operational.

6. A self contained emergency light unit for mounting in a standard electrical wall box of the type commonly used for housing electrical wall receptacles comprising a casing having a frontal portion defining a wall mounting plate, a lamp for supplying emergency light, means for mechanically mounting the lamp such that its light emanates from the front of the unit, the casing also having a rectangular box portion extending rearwardly from the frontal portion of a size that will fit into the standard electrical wall box, electrical circuit means housed within the casing, means for electrically connecting the electrical circuit means to the main power supply of the building in which the unit is installed, emergency power supply means mounted in the casing, means associated with the electrical circuit means for sensing a power failure in the main power supply, and for supplying electrical power from the emergency power supply means to the lamp when a power failure occurs, thereby energizing the lamp, test switch means in the electrical circuit means which when actuated simulates a power failure for testing the operability of the unit, a spring biased rod reciprocally mounted to the front wall of the unit with one end exposed at the front of the unit and the other end contacting the switch means for actuation thereof as the rod is moved rearwardly, and means for mounting the unit in the electrical wall box.

7. The emergency light unit of claim 6 including an electrical receptacle accessible from the front of the unit, and means connecting the electrical receptacle to the main power supply of the building for use when the main power is on.

8. The emergency light of claim 7 wherein the entire casing including the frontal portion defining the wall mounting plate, the electrical receptacle, and the rearwardly extending portion is of unitary, molded one-piece, construction.

9. The emergency light unit of claim 6 including photosensitive means for detecting the ambient light level of the immediate area in front of the unit, and means associated with the electrical circuit means and responsive to the photosensitive means for supplying power from the emergency power supply means to the lamp only when the ambient light is below a prescribed level.

10. The emergency light unit of claim 6 wherein the emergency power supply means includes rechargeable batteries, and including means associated with the electrical circuit means for charging the batteries whenever the main power is on.

11. The emergency light unit of claim 9 including an electrical receptacle accessible from the front of the unit, and means connecting the electrical receptacle to the main power supply for use of the receptacle when the main power is on.

12. The emergency light unit of claim 11 wherein the rectangular box portion extending rearwardly from the frontal plate is approximately 2½ inches long, 1½ inches wide and 1¼ inches deep.

13. The emergency light unit of claim 10 wherein except when the lamp is energized, the maximum current drain on the emergency power supply batteries is only approximately 1 milliamp.

14. The emergency light unit of claim 13 wherein when the main power is on, all but approximately 1 milliamp of charging current produced from the main power supply is delivered to charge the emergency power supply batteries, the circuit means offering a relatively high impedance path for the charging current except through the emergency power supply battery.

15. The emergency light unit of claim 14 wherein the main power is approximately 110 volts, AC, 60 hertz, and including means for converting the main power to rectified power of a maximum current capacity of approximately 60 milliamps, whereby approximately 59 milliamps are delivered to charge the batteries, and only approximately 1 milliamp is lost in operating the remainder of the electrical circuit means.

16. A self-contained emergency light unit for mounting in a standard electrical wall box of the type commonly used for housing electrical wall receptacles, and the like, and is particularly adapted for installation by simple substitution of the unit for an electrical receptacle comprising a casing having a frontal portion defining a wall mounting plate, a lamp for supplying emergency light, means for mechanically mounting the lamp in the casing such that its light emanates from the front of the unit, the casing also having a rectangular box portion extending rearwardly from the frontal portion of a size that will fit into the standard electrical wall box, electrical circuit means housed within the casing, means for electrically connecting the electrical circuit means to the main power supply of the building in which the unit is installed, emergency power supply means mounted in the casing, an electrical receptacle accessible from the front of the unit, means connecting the electrical receptacle to the main power supply of the building for use when the main power is on, photosensitive means mounted in the mounting plate for detecting the ambient light level in front of the unit, means associated with the electricl circuit means for sensing a power failure in the main power supply and responsive to the photosensitive means for supplying power from the emergency power supply means to the lamp only when a main power failure occurs and the ambient light is below a prescribed level, thereby energizing the lamp, and means for mounting the unit in the electrical wall box with the back side of the frontal plate flush with the wall, whereby the unit can be installed in even old buildings by simple substitution of the unit for an electrical receptacle without the need for special wiring or other special mounting preparation.

17. The emergency light unit of claim 16 wherein the entire casing including the frontal portion defining the wall mounting plate, the electrical receptacle, and the rearwardly extending portion is of a unitary, molded one-piece, construction.

18. The emergency light unit of claim 9 wherein the self-contained unit is hermetically sealed.

* * * * *